US007720755B1

(12) United States Patent
Coyle

(10) Patent No.: US 7,720,755 B1
(45) Date of Patent: May 18, 2010

(54) CARD-BASED SYSTEM AND METHOD FOR ISSUING NEGOTIABLE INSTRUMENTS

(75) Inventor: Adam Coyle, Parker, CO (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 1269 days.

(21) Appl. No.: 09/713,770

(22) Filed: Nov. 16, 2000

(51) Int. Cl.
*G06Q 40/00* (2006.01)
*G07F 19/00* (2006.01)

(52) U.S. Cl. .............................. 705/39; 705/40; 235/379

(58) Field of Classification Search .................... 705/39, 705/51, 74, 65, 26, 14, 42, 38, 36, 27, 44, 705/41, 40, 36 R, 36 T, 4
See application file for complete search history.

(56) References Cited

U.S. PATENT DOCUMENTS

| 4,385,285 | A |   | 5/1983  | Horst            |         |
|-----------|---|---|---------|------------------|---------|
| 4,699,532 | A |   | 10/1987 | Smith            |         |
| 5,014,212 | A |   | 5/1991  | Smith            |         |
| 5,119,293 | A |   | 6/1992  | Hammond          |         |
| 5,457,305 | A |   | 10/1995 | Akel et al.      |         |
| 5,477,037 | A |   | 12/1995 | Berger           |         |
| 5,477,038 | A |   | 12/1995 | Levine et al.    |         |
| 5,511,114 | A |   | 4/1996  | Stimson et al.   |         |
| 5,546,523 | A |   | 8/1996  | Gatto            |         |
| 5,570,465 | A |   | 10/1996 | Tsakanikas       |         |
| 5,577,109 | A |   | 11/1996 | Stimson et al.   |         |
| 5,644,727 | A | * | 7/1997  | Atkins ..........................  | 705/40 |
| 5,650,604 | A | * | 7/1997  | Marcous et al. .............  | 235/379 |
| 5,663,546 | A |   | 9/1997  | Cucinotta et al. |         |
| 5,678,937 | A |   | 10/1997 | Smith            |         |
| 5,686,713 | A |   | 11/1997 | Rivera           |         |
| 5,721,768 | A |   | 2/1998  | Stimson et al.   |         |

(Continued)

FOREIGN PATENT DOCUMENTS

EP 949596 A2 * 10/1999

OTHER PUBLICATIONS

Billpoint (Company Overview) www.billpoint.com, Jul. 23, 2000.*

(Continued)

*Primary Examiner*—Kelly Campen
(74) *Attorney, Agent, or Firm*—Townsend and Townsend and Crew LLP

(57) ABSTRACT

A card-based system for a non-bank entity to indirectly provide direct deposit capabilities for funds representing prepayments for negotiable instruments. When a direct deposit of funds into a first account associated with the individual and maintained by a first entity is detected, the total amount of the funds is transferred into a second account associated with the individual and maintained by a second entity. The first entity is a bank or other financial institution subject to federal banking regulations, while the second entity is not subject to federal banking regulations. The individual may withdraw the funds from the second account by using a card at an ATM or POS terminal requesting the issuance of negotiable instruments. Negotiable instruments may be issued in any dollar amount not exceeding the balance of the second account. A properly enrolled customer may make subsequent deposits into the second account. Security is provided by requiring the presentation of identify verification when the negotiable instruments are endorsed and cashed.

15 Claims, 12 Drawing Sheets

U.S. PATENT DOCUMENTS

| | | | | | |
|---|---|---|---|---|---|
| 5,770,844 | A | * | 6/1998 | Henn | 235/379 |
| 5,875,437 | A | * | 2/1999 | Atkins | 705/40 |
| 5,893,078 | A | * | 4/1999 | Paulson | 705/35 |
| 5,897,625 | A | * | 4/1999 | Gustin et al. | 705/43 |
| 5,963,647 | A | * | 10/1999 | Downing et al. | 705/39 |
| 5,966,698 | A | * | 10/1999 | Pollin | 705/34 |
| 5,993,047 | A | | 11/1999 | Novogrod et al. | |
| 6,105,008 | A | | 8/2000 | Davis et al. | |
| 6,119,931 | A | | 9/2000 | Novogrod | |
| 6,149,055 | A | | 11/2000 | Gatto | |
| 6,195,453 | B1 | | 2/2001 | Simonoff | |
| 6,330,544 | B1 | | 12/2001 | Walker et al. | |
| 6,352,201 | B1 | | 3/2002 | Novogrod | |
| 6,367,693 | B1 | | 4/2002 | Novogrod | |
| 6,374,231 | B1 | * | 4/2002 | Bent et al. | 705/36 R |
| 6,439,454 | B1 | | 8/2002 | Masson et al. | |
| 6,478,220 | B2 | | 11/2002 | Seifert et al. | |
| 6,611,598 | B1 | | 8/2003 | Hayosh | |
| 6,661,910 | B2 | * | 12/2003 | Jones et al. | 705/42 |
| 6,695,204 | B1 | | 2/2004 | Stinson | |

OTHER PUBLICATIONS

DotBank copyrighted 1999, www.dotbank.com Feb. 7, 2000.*
Dictionary of Finance and Investment terms, fifth edition, 1998, pp. 202-203, 386.*
www.onelook.com.*
www.bloomberg.com.*
Farrell, James J. "Smart cards have earned their stripes. (smart cards may replace magnetic-stripe cards) (Technology Information)" Oct. 28, 1996 Electronic Engineering Times, n925, p. 86(1).*
Anonymous "Industry fights fraud at in-pump terminals " Jul. 1997, NPN: National Petroleum News v89n7 pp. 16.*
Olivia et al. "The tax Web" Fall 1998 Marketing Management v7n3 pp. 44-47.*

* cited by examiner

DATE: _____

PAY TO THE ORDER OF: (SUB-ACCOUNT HOLDER)

ACCOUNT NUMBER: XXXXX

NOT TO EXCEED $XX.    PHOTO ID REQUIRED.

*FIG. 10a*

ENDORSE HERE

DO NOT WRITE BELOW THIS LINE.

*FIG. 10b*

CARD-BASED SYSTEM AND METHOD FOR ISSUING NEGOTIABLE INSTRUMENTS

FIELD OF THE INVENTION

The present invention relates generally to prepaid negotiable instruments. More specifically, the present invention relates to pre-paying funds into a transaction account and subsequently drawing upon those funds through the issuance of negotiable instruments.

BACKGROUND

Banks traditionally offer certain benefits to their customers, such as safe-storage of and access to funds, direct deposit capabilities, automated teller machine (ATM) access and convenience of service points, etc. Many members of the cash based society understand and seek such bank-like benefits at reasonable and straightforward prices, but are often reluctant to enter into a relationship with banks. One reason for the cash based society's avoidance of banks is that they tend to feel that they are not respected by banks. Also, members of the cash based society typically reject hidden fees, limited services and locations, approval processes, minimums, etc. Thus, the prevailing product and service approaches of banks tend to intimidate members of the cash based society, or at least impede the successful adaptation of bank services to their needs and lifestyles.

Some banks and financial institutions offer "low cost" or "basic" accounts. Such financial institutions usually restrict services, offer "lower" fees, and may waive minimum balance requirements. However, such low cost accounts remain unappealing to many members of the cash based society because they tend to be offered through bank branches with limited hours and locations and ATMs which may not be local to the consumer. Furthermore, there is still a credit check and an approval process associated with "low cost" accounts, which the cash based consumer might fail because of credit history or residence problems. In addition, the cash based consumer may be worried about garnishments or inconvenient, disrespectful service.

Some financial institutions offer debit card payroll solutions. For example, a branded check printing service may provide direct deposits capabilities for federal benefit checks in exchange for a transaction fee. However, federal benefit check distribution services do not allow multiple withdrawals in varied amounts. Transaction fees for these and other debit card payroll solutions tend to be expensive. There is currently no other banking service offered to the cash based society that provides direct deposit capability.

Accordingly, there remains a need for a financial service that offers safe-storage of and access to funds, direct deposit capabilities, automated teller machine (ATM) access, convenient service points, etc, without requiring a traditional bank-customer relationship.

SUMMARY OF THE INVENTION

The present invention meets the above-described needs by providing a system and method whereby a non-bank entity, such as a Licensed Memory Transmitter, may issue prepaid negotiable instruments to an individual. In one aspect of the invention an account structure is provided that allows a non-bank entity to indirectly provide direct deposit capabilities for funds representing pre-payments for negotiable instruments. When a direct deposit of funds into a first account associated with the individual and maintained by a first entity is detected, the total amount of the funds is transferred, or swept, into a second account associated with the individual and maintained by a second entity. The first entity is a bank or other financial institution subject to federal banking regulations, while the second entity is not subject to federal banking regulations. Detecting a direct deposit of funds into the first account comprises detecting a credit in the total amount of the funds posted in the first account. Automatically transferring the total amount of the funds into the second account comprises posting a debit in the total amount of the funds in the first account and posting a credit in the total amount of the funds in the second account.

An account number and a PIN are associated with the second account and are provided to the individual. When a request by the individual for the issuance of a negotiable instrument is detected, the PIN and the account number are verified to determine that the account number identifies the second account and that the PIN identifies the individual as being authorized to access the second account. Then, a determination is made as to whether the value of the requested negotiable instrument is in excess of the balance of the second account. If the value of the requested negotiable instrument plus any fees charged to the individual is not in excess of the balance of the second account, the issuance of the requested negotiable instrument to the individual is authorized. In response to the issuance of the requested negotiable instrument, the balance of the second account is debited by the value of the requested negotiable instrument plus any fees. When the individual requests the issuance of multiple negotiable instruments, a determination is made as to whether the aggregate value of the requested multiple negotiable instruments plus any fees is not in excess of the balance of the second account. Upon issuance of the requested multiple negotiable instruments to the individual, the second account is debited by the aggregate value of the requested multiple negotiable instruments plus any fees.

A properly enrolled customer may make subsequent deposits into the second account. Upon requesting a balance increase for the second account, the individual tenders a payment in the requested amount. In response to the balance increase request the second account is credited in the requested amount.

Another aspect of the invention provides a system and method for conducting anonymous transactions with an individual regarding prepaid negotiable instruments. An anonymous account is provided that is identified by an account number. The individual is then provided with the account number and a PIN allowing access to the anonymous account. Upon verification of the PIN and the account number, the individual is authorized to make an initial deposit of funds into the anonymous account. The initial deposits of funds represents a prepayment for negotiable instruments. The individual is thus authorized to request the issuance of negotiable instruments in an amount not exceeding the initial deposit of funds. When the issuance of negotiable instruments has depleted the initial deposit of funds, the anonymous account is closed and no other transactions are authorized.

The anonymous account may be converted into a non-anonymous account if the individual provides personal identifying information, such as name, address, social security number, etc. Once such personal identifying information is provided, a non-anonymous account associated with the individual may be established. The non-anonymous account may have a new account number and PIN associated therewith. The new account number and PIN may be used by the individual to make subsequent deposits of funds into the non-anonymous account. While an anonymous account is not authorized to accept direct deposits of funds, the non-anonymous account may be linked to a traditional bank account, via a communications link, so as to indirectly offer direct deposit capabilities.

These and other aspects of the present invention will become apparent upon review of the following description with particular reference to the attached drawings.

BRIEF DESCRIPTION OF THE DRAWINGS

FIG. 10a illustrates the front side of a negotiable instrument issued in the system of FIGS. 8a and 8b.

FIG. 10b illustrates the back side of a negotiable instrument issued in the system of FIGS. 8a and 8b.

DETAILED DESCRIPTION

Figure 1:
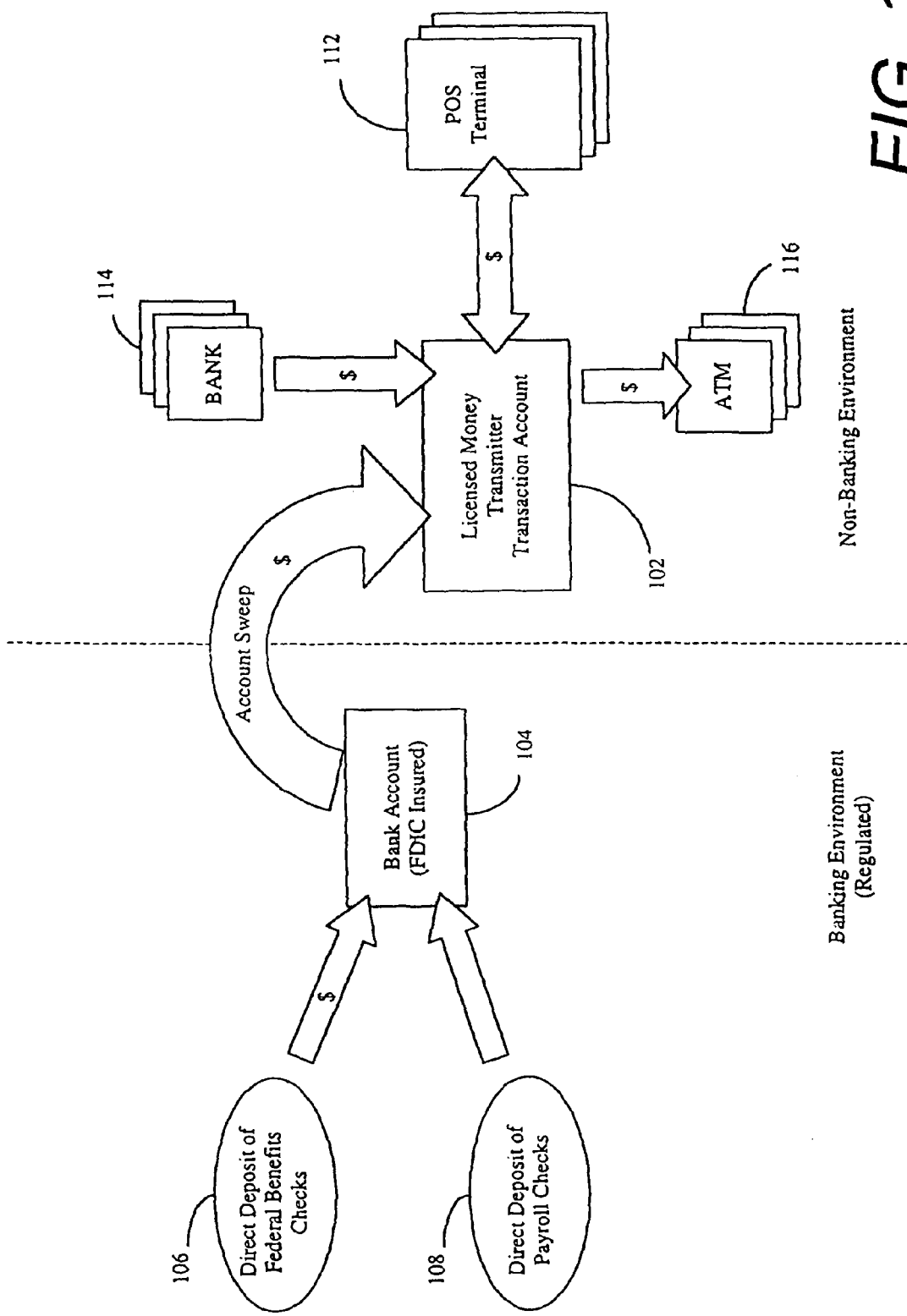
FIG. 1 is a functional block diagram illustrating the movement of funds through an exemplary account structure in an illustrative embodiment of the present invention.

Members of the cash based society may avoid the above-described drawbacks associated with traditional banking relationships by conducting business with Licensed Money Transmitters. An example of a Licensed Money Transmitter is Western Union. A Licensed Money Transmitter is legally authorized to transmit funds, either by wire, facsimile, electronic transfer, courier or otherwise, within the United States or to or from locations outside the United States. A Licensed Money Transmitter may also be authorized to sell or issue checks, drafts, warrants, money orders, traveler's checks or other negotiable instruments. In some instances, a Licensed Money Transmitter may even be authorized to sell and/or exchange currency. Unlike traditional bank transactions, however, transactions handled by a Licensed Money Transmitter are not insured by the FDIC.

The present invention allows a Licensed Money Transmitter to accept from its consumers advance payments for negotiable instruments. By way of an online, non-interest bearing, non-FDIC insured transaction account, the Licensed Money Transmitter may provide payment instruments and money transmission services to its cash based consumers without the need for the qualifying/approval barriers, high costs, and intricate fee and reporting obstacles associated with a traditional banking relationship. The transaction account maintained by the Licensed Money Transmitter may be configured to accept deposits from a point of sale (POS) terminal at a retail establishment. In an exemplary embodiment, the transaction account may also be configured to indirectly accept direct deposits of funds, such as federal benefits checks and employee payroll checks.

The consumer may access his or her pre-paid negotiable instruments electronically via a POS terminal or an automated teller machine (ATM). Upon demand, a negotiable instrument, such as a money order, may be printed and cashed for the consumer at a POS terminal by an agent of the Licensed Money Transmitter. Negotiable instruments may be printed in odd/specific amounts so that the customer may receive cash in odd/specific denominations for the purpose of paying bills, etc. Alternatively, an ATM may dispense the requested cash to the consumer.

Since the transaction account maintained by the Licensed Money Transmitter is not built around the classic FDIC insured demand deposit account (DDA) structure, overall system costs, and ultimately consumer costs, are reduced. For example, because the funds deposited into the transaction account are considered as advance payments for negotiable instruments, no credit approvals are required. Also, because withdrawals from the transaction account are processed on-line and in real time, mechanisms may be provided for ensuring that there are no account overdrafts. Without overdrafts, there is no need to worry about fees attributable to an overdrawn account status.

By establishing a non-banking service that offers POS and ATM access to cash, the present invention allows cash based consumers to avoid visitations to bank branches that may not be conveniently located. Instead, the cash based consumer may hear about the services of the present invention and receive enrollment materials at the same locations at which they conduct other financial or retail transactions, or through direct advertising. Consumers may transfer funds directly from the service desk (via a POS terminal) of a preferred retailer at a time of day that is convenient for their lifestyles. Consumers may also be provided with "VRU" or "Voice 24×7" services so as not to be made dependent only on ATMs and agents operating POS terminals.

As mentioned above, an exemplary transaction account may also be configured to indirectly accept direct deposit transactions. The transaction account is not configured to directly accept direct deposit transactions due to the desire of the cash based consumer to avoid a traditional banking relationship. Various federal regulations, which are well known to those skilled in the art, require that certain direct deposit transactions involve FDIC insured bank accounts, and the like. For example, direct deposit of federal benefits checks may only be made into traditional FDIC insured bank accounts.

Similarly, banking industry requirements require that other types of direct deposit transactions involve a traditional bank account. By way of illustration, direct deposit of payroll checks are made through an automated clearinghouse (ACH) system, which uses routing and transit (R&T) numbers and other data to effect the transfer of funds between accounts. R&T numbers are assigned exclusively to FDIC insured banks. Therefore, in order to meet the cash based consumer's demand for non-banking services, the Licensed Money Transmitter may choose not to directly offer direct deposit capabilities that are subject to federal banking regulations and banking industry requirements.

The following description will hereinafter refer to the drawing, in which like numerals indicate like elements throughout the several figures. An exemplary flow of funds through an illustrative account system of the present invention is described with reference to the functional block diagram of FIG. 1. As shown, a transaction account 102 is established and maintained by a Licensed Money Transmitter or an agent thereof. The transaction account 102 may be thought of as a general account held in the name of the Licensed Money Transmitter. The general account may be divided into slub-accounts that are associated with individual consumers. Alternately, separate transaction 102 accounts may be established in the names of each individual consumer.

Due to various federal regulations and industry requirements, the transaction account 102 is not FDIC insured and is not authorized to accept funds that are transferred through the Automatic Clearinghouse (ACH) system of the federal reserve. The ACH is an electronic funds transfer system used by retail and commercial organizations. The ACH acts as a normal clearing house, receiving a transaction over the network and then splitting and routing the debit and credit portions of the transaction to the player's and the payee's banks. Without ACH access, the transaction account 102 is not authorized to accept direct deposits of federal benefits checks, payroll checks from employees, or the like.

Accordingly, an exemplary embodiment of the present invention contemplates that a Licensed Money Transmitter will establish a communication channel with a traditional FDIC insured financial institution, such as a bank, in order to service direct deposit customers. The bank will maintain an FDIC insured bank account 104, which may either be held in the name of the Licensed Money Transmitter or in the name of an individual consumer. The bank account 104 is capable of accepting federal benefit direct deposits 106 and payroll direct deposits 108, as well as any other type of federally regulated or banking industry standardized transfer of funds. The communication channel between the Licensed Money Transmitter and the bank may allow the Licensed Money Transmitter to monitor the bank account 104 for incoming direct deposit transactions.

In an exemplary embodiment of the present invention, incoming direct deposit transactions are "swept" from the bank account 104 into the transaction account 102. In other words, funds that are deposited in the bank account 104 are instantly transferred into the transaction account 102. The instant transfer of funds avoids capitalization of the bank, i.e., no interest on the funds is accumulated. Accordingly, the communication channel between the Licensed Money Transmitter and the bank allows customers of the Licensed Money Transmitter to take advantage of direct deposit mechanisms, without themselves having to become customers of a bank. In addition, non-direct deposit funds may be deposited into the transaction account 102 via a POS terminal 102 or via any other bank 114 or financial institution.

Funds that are held in the transaction account 102 may be dispersed to the customer through a POS terminal 112 operated by an agent of the Licensed Money Transmitter, or through a traditional ATM 116. POS terminals 112 and ATMs 116 allow a consumer to conduct a transaction from remote locations. ATMs comprise computer terminals that may be configured for remote access, directly or indirectly through switching networks, to a financial account of the consumer, such as a bank account 104 or a transaction account 102. Similarly, POS devices 112 comprise computer terminals located at a merchant's place of business which allow access to a consumer's account information stored in a computer within a network of financial institutions, to permit the transfer of funds from the consumer's account to the merchant's account.

Figure 2:
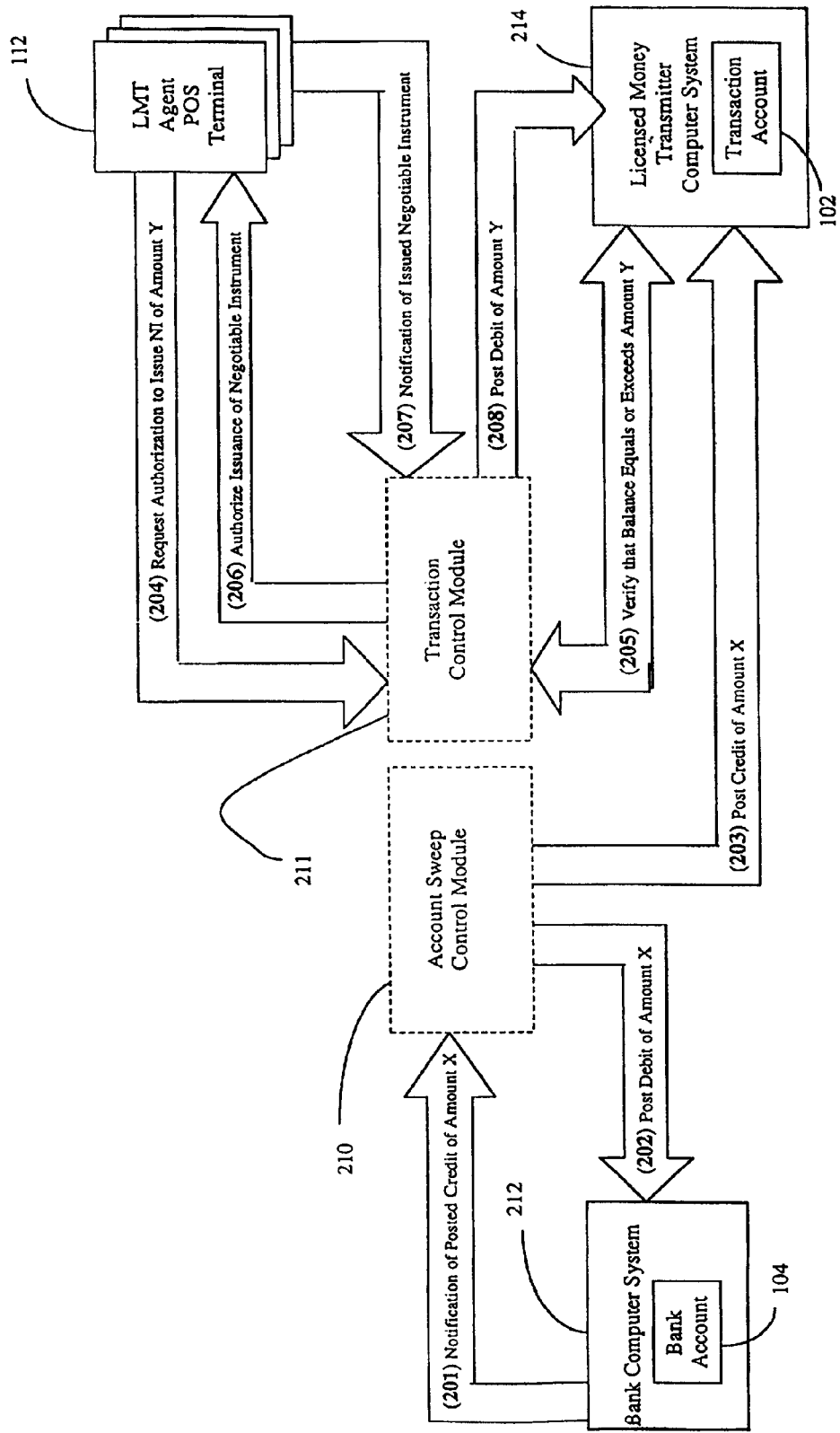
FIG. 2 is a functional block diagram illustrating the process flow of an illustrative embodiment of the present invention.

FIG. 2 illustrates the process flow of an account sweep control module 210, which may be implemented through one or more software program modules. The account sweep control module 210 facilitates communications between a bank computer system 212 and a Licensed Money Transmitter (LMT) computer system 214. In particular, the account sweep control module 210 facilitates the transfer of funds between a bank account 104 accessible by the bank computer system 212 and a transaction account 102 accessible by the Licensed Money Transmitter computer system 214. The account sweep control module 210 may be implemented as a component of the Licensed Money Transmitter computer system 214, as a component of the bank computer system 212, or as a component of a distinct computer system. The account sweep control module 210 is configured to monitor the bank account 104 in order to detect the posting of a credit to the bank account 104. As shown in step 201, an exemplary embodiment of the account sweep control module 210 receives a notification from the bank computer 212 whenever a credit is posted to the bank account 104. Methods of configuring the software and hardware of the bank computer system 212 to send a notification to the account sweep control module 210 upon the posting of a credit to the bank account 104 will be apparent to those skilled in the art.

When a notification of a posted credit is received, the exemplary account sweep control module 210 communicates with the bank computer 212 at step 202 in order to post a debit to the bank account 104. In the ideal situation, the credit of funds exists in the bank account 104 for a period of time that is on the order of a fraction of a second prior to the posting of the debit. The credit of funds posted to the bank account 104 may be in any "amount X." The subsequent debit posted by the account sweep control module 210 to the bank account 104 is in the total "amount X." Accordingly, the bank account 104 is "zeroed out" and, except for a fraction of a second or so, maintains a balance of zero. The debit is posted to the bank account 104 instantly so as to avoid capitalization of the bank.

At step 203, the exemplary account sweep control module 210 communicates with the Licensed Money Transmitter computer system 214 in order to post a credit of the total "amount X" into the transaction account 102. The transaction account 102 is a holding or escrow account that is used to store the funds of the consumer. The transaction account 102 does not accrue interest and does not function as a traditional bank account. The funds in the transaction account 102 may represent prepaid negotiable instruments that may be issued to the consumer via a POS terminal 112 operated by an agent of the Licensed Money Transmitter.

When a consumer requests the issuance of a prepaid negotiable instrument, a request for authorization to issue the negotiable instrument may be transmitted from a POS terminal 112 to a transaction control module 211. A transaction control module may be implemented through one or more software program modules. The transaction control module 211 may be implemented as a component of the Licensed Money Transmitter computer system 214, or as a component of a distinct computer system. A transaction control module 211 is configured to interact with the transaction account 102 and POS terminals 112 in order to manage transactions. By way of illustration, a POS terminal 112 may request authorization to issue a negotiable instrument of amount "Y," as shown in step 204. The transaction control module 211 accepts the request for authorization and communicates at step 205 with the Licensed Money Transmitter computer system 214 in order to verify that the balance of the transaction account 102 equals or exceeds the requested amount "Y" plus any transaction fees charged by the Licensed Money Transmitter. The transaction control module 211 may also be responsible for verifying that the customer requesting the negotiable instrument is in fact authorized to receive the negotiable instrument. For example, the customer may be required to provide a personal identification number (PIN) and an account code, which may be transmitted from the POS terminal 112 to the transaction control module 211. The transaction control module 211 may communicate with a database (not shown) hosted by the Licensed Money Transmitter computer system 214 in order to determine whether the PIN and account code provided by the customer are authentic. Additional details regarding security features of the illustrative embodiments of the present invention will be described below.

If the balance in the transaction account 102 equals or exceeds the requested amount "Y" plus any transaction fees, the transaction control module 211 transmits to the POS terminal 112 an authorization to issue the requested negotiable instrument, as shown in step 206. However, if the balance in the transaction account 102 is less than the requested amount "Y" plus any transaction fees, the transaction control module 211 will not authorize the issuance of the requested negotiable instrument. As mentioned, the funds held in the transaction account 102 are considered to represent prepaid negotiable instruments. Therefore, the transaction account 102 will not be debited in any amount that exceeds the prepaid value of the negotiable instruments plus any transaction fees. Transaction fees may be charged at the time of the transaction so as to avoid the situation where the transaction account 102 is depleted and the customer owes a debt to the Licensed Money Transmitter. Ensuring that the transaction account 102 is never overdrawn avoiding the need to charge additional service fees associated with an overdraw account status.

After receiving authorization to issue the requested negotiable instrument, the agent of the Licensed Money Transmitter operating the POS terminal 112 prints and cashes the negotiable instrument in the amount "Y" plus any transaction fees. The agent may then retain any transaction fees and provide the remainder of the cash to the consumer. At step 207, the POS terminal 112 notifies the transaction control module 211 that the negotiable instrument has been issued. Then, at step 208 the transaction control module 211 communicated with the Licensed Money Transmitter computer system 214 in order to post a debit in the amount "Y" plus any transaction fees to the transaction account 102.

The exemplary embodiments described with respect to FIG. 1 and FIG. 2 include a two account structure (i.e., a bank account 104 and a transaction account 102) and an account sweep control module 210. It will be appreciated to those of ordinary skill in the art that the two account structure and the account sweep control module 210 are not necessary in situations where there is no desire to indirectly provide direct deposit capabilities. Various features and aspects of the present invention may be implemented in systems that do not require such direct deposit capabilities. In addition, it should be appreciated that the functionality of the account sweep control module 210 and the transaction control module 211 has been provided by way of example only. Additional functions may be performed by either module without limitation of the scope of the present invention.

Figure 3:
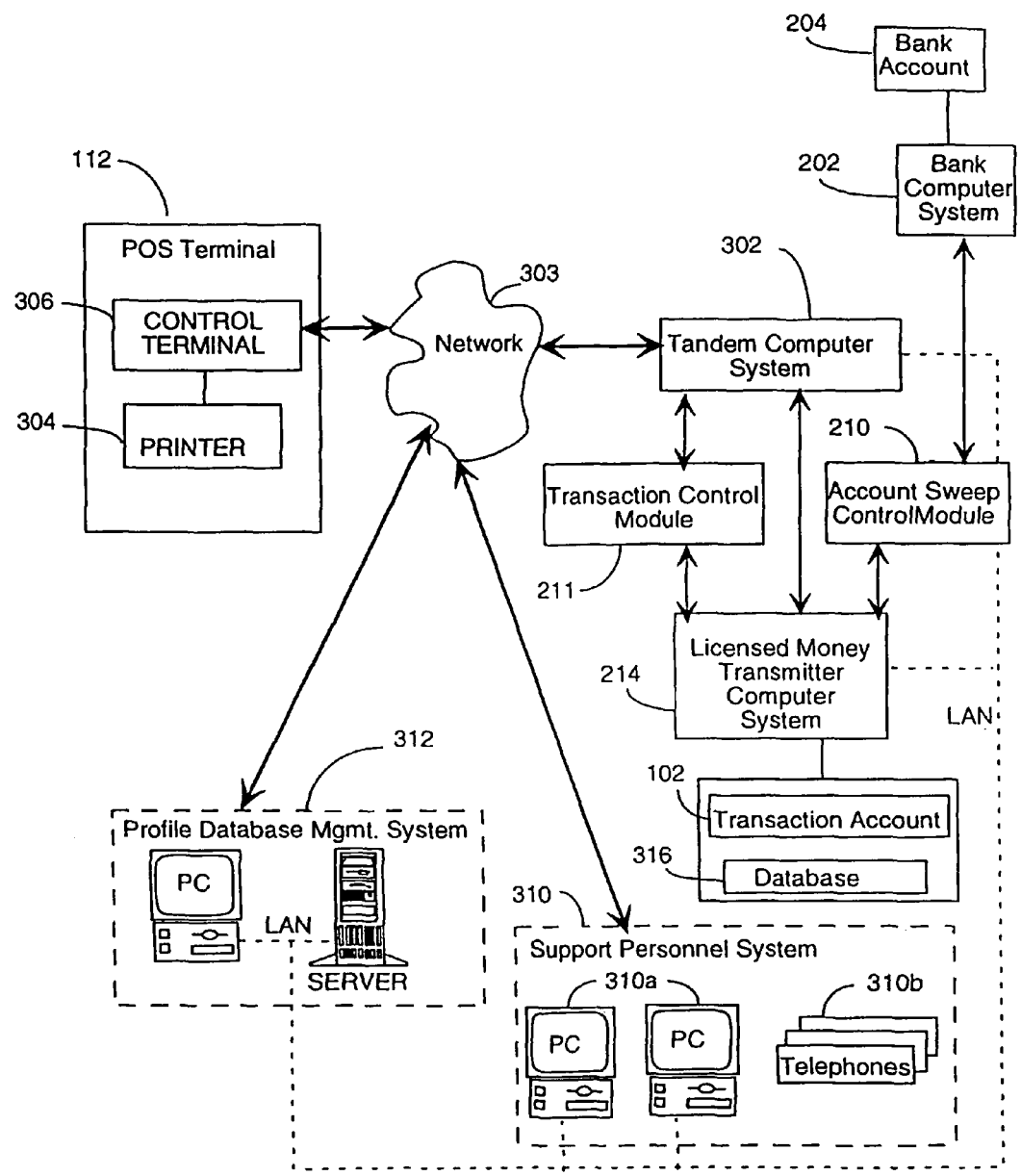
FIG. 3 is a functional block diagram illustrating an exemplary financial network environment for an illustrative embodiment of the present invention.

FIG. 3 is an overview of an exemplary Licensed Money Transmitter network environment 300 that may host a system in accordance with the illustrative embodiments of the present invention. A POS terminal 112 communicates with a Tandem computer system 302 via a network 303. The Tandem computer system 302 may be in communication with, or may comprise a part of, the Licensed Money Transmitter computer system 214. Although the functionality of a "Tandem" brand computer system is a well-known in the art, as used herein a Tandem computer system 302 may refer to any generic network server system. A POS terminal 112 generally includes a printer 304 and a control terminal 306. The control terminal 306 typically comprises a keypad, a display, a modem, a memory, and a processor. The control terminal 306 may, communicate print commands to the printer 304 via, for example, an RS-232 link or other suitable communications link. The control terminal 306 manages negotiable instrument transactions and stores data in a memory.

A profile database management system 312 may be provided for management of the POS terminals 112. In manners well known in the art, software updates and other data may be downloaded from the profile database management system 312 to a POS terminal 112. Such software updates and other data may be generated and stored in the profile database management system 312 by a Licensed Money Transmitter support personnel system 310. The Licensed Money Transmitter support personnel system 310 may include personal computers 310a operated by support personnel end telephones 310b manned by support personnel or linked to VRU systems. The Licensed Memory Transmitter support personnel system 310 may be coupled to the profile database management system 312 via a local area network (LAN) or other private communications link. The Licensed Money Transmitter support personnel system 310 may also be linked to the network 303, so as to be accessible to customers via telephone systems.

At predetermined times, the control terminal 306 of the POS terminal 112 transmits its data to the Tandem computer system 302 via the network 303. The Tandem computer system 302 creates a batch file comprising data received from many POS terminals 112. The Tandem computer system 302 typically forwards batch files to the appropriate component of the Licensed Money Transmitter computer system 214 at predetermined times. For security purposes, the Tandem computer system 302 may transmit a batch file to the Licensed Money Transmitter computer system 214 via a private network or other private communications link.

The Licensed Money Transmitter computer system 214 is configured for, among other things, accessing the transaction account 102 maintained by the Licensed Money Transmitter. The transaction account 102 may be physically stored in a memory device in communication with the Licensed Money Transmitter computer system 214. The Licensed Money Transmitter computer system 214 may also host a database 316 of account codes, PINs, and other customer/account information. Such customer/account information may be used for security purposes and to monitor the nature and frequent of transactions performed by each customer.

The Licensed Money Transmitter computer system 214 may also comprise or be in communication with the account sweep control module 210. The account sweep control module 210 is in turn in communication with the bank computer system 212. The bank computer system 212 is configured for, among other things, accessing the bank account 104, which may physically be stored in a memory device in communication with the bank computer system 212.

The Tandem computer system 302 may be in communication with the transaction control module 211. Thus, communications to and from the POS terminal 112 may be routed from and to the transaction control module 211 via the Tandem computer system 302. As mentioned, the transaction control module 211 is configured to manage transactions involving deposits into and withdraws from the transaction account 102. Although shown as being a distinct network component, those skilled in the art should appreciate that the transaction control module 211 may alternately be implemented as a component of either the Tandem computer system 302 or the Licensed Money Transmitter computer system 214.

Figure 4:
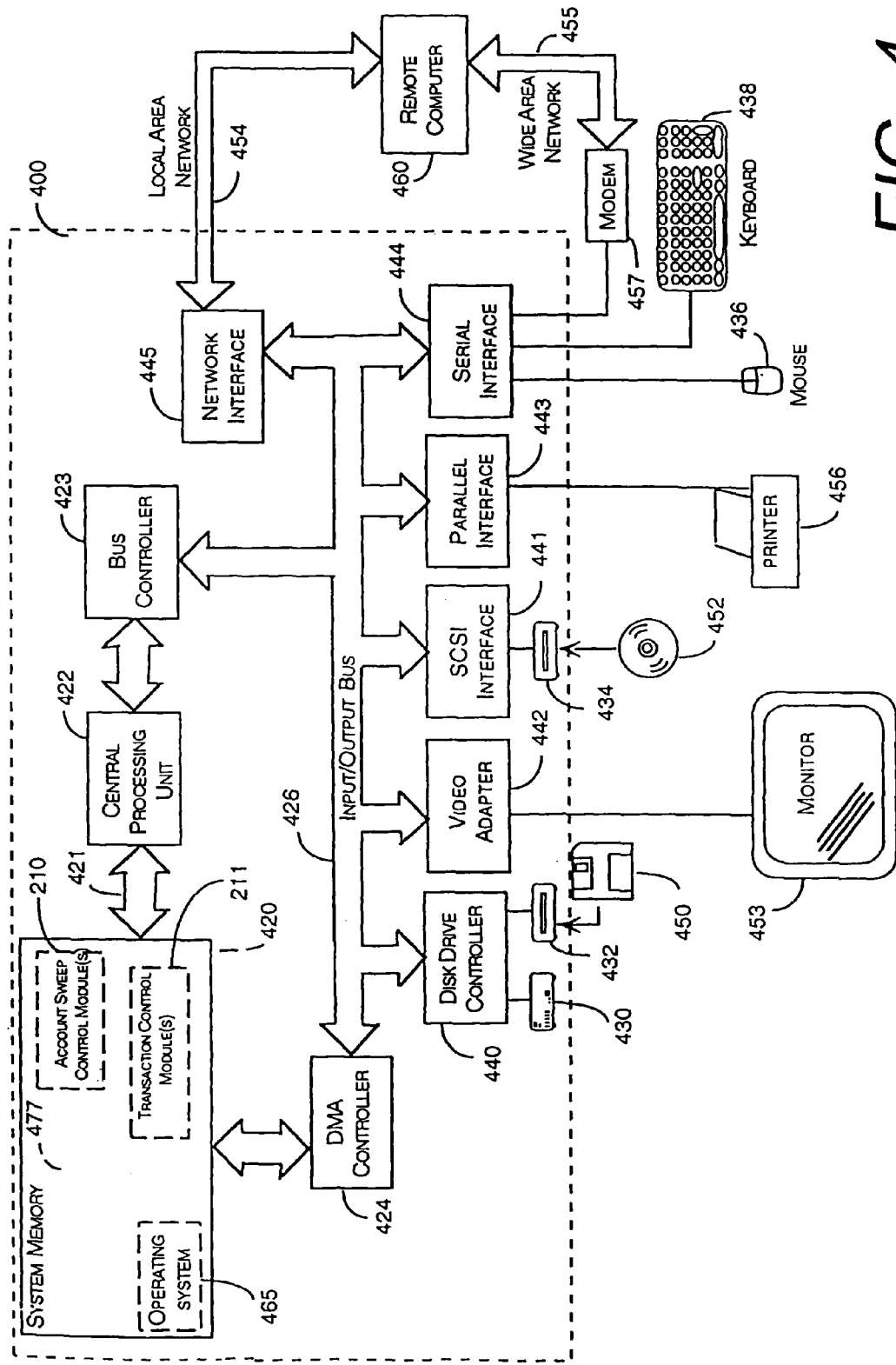
FIG. 4 is a functional block diagram of a computer system illustrating an operating environment for illustrative embodiments of the program modules of the present invention.

FIG. 4 and the following discussion are intended to provide a brief and general description of a suitable computing environment for implementing various aspects of the present invention embodied in software program modules, namely the exemplary account sweep control module 210 and the exemplary transaction control module 211. Although the system shown in FIG. 4 is a conventional computer 400, those skilled in the art will recognize that the invention also may be implemented using other types of computer system configurations. The computer 400 includes a central processing unit 422, a system memory 420, and an Input/Output ("I/O") bus 426. A system bus 421 couples the central processing unit 422 to the system memory 420. A bus controller 423 controls the flow of data on the I/O bus 426 and between the central processing unit 422 and a variety of internal and external I/O devices. The I/O devices connected to the I/O bus 426 may have direct access to the system memory 420 using a Direct Memory Access ("DMA") controller 424.

The I/O devices are connected to the I/O bus 426 via a set of device interfaces. The device interfaces may include both hardware components and software components. For instance, a hard disk drive 420 and a floppy disk drive 432 for reading or writing removable media 450 may be connected to the I/O bus 426 through a disk drive controller 440. An optical disk drive 434 for reading or writing optical media 452 may be connected to the I/O bus 426 using a Small Computer System Interface ("SCSI") 441. The drives and their associated computer-readable media provide nonvolatile storage for the computer 400. In addition to the computer-readable media described above, other types of computer-readable media may also be used, such as ZIP drives or the like.

A display device 453, such as a monitor, is connected to the I/O bus 426 via another interface, such as a video adapter 442. A parallel interface 443 connects synchronous peripheral devices, such as a laser printer 456, to the I/O bus 426. A serial interface 444 connects communication devices to the I/O bus 426. A user may enter commands and information into the computer 400 via the serial interface 444 using an input device, such as a keyboard 438, a mouse 436 or a modem 457. Other peripheral devices (not shown) may also be connected to the computer 400, such as audio input/output devices or image capture devices.

A number of software program modules may be stored on the drives and in the system memory 420. The system memory 420 can include both Random Access Memory ("RAM") and Read Only Memory ("ROM"). The software program modules control the manner in which the computer 400 functions and interacts with the user, with I/O devices or with other computers. Software program modules include routines, operating systems 465, application programs, data structures, and other software or firmware components. In an exemplary embodiment, the present invention may include one or more account sweep control modules 210 and one or more transaction control modules 211. The one or more account sweep control modules 210 may comprise computer executable instructions for facilitating communications between a bank computer system 212 and a Licensed Money Transmitter computer system 214. The one or more account sweep control modules 210 may further comprise computer executable instructions for monitoring credits posted to a bank account 104, posting debits to the bank account 104 and posting credits to the transaction account 102, as previously described. The one or more transaction control modules 211 may comprise computer executable instructions for facilitating communications between a POS terminal 112 or an ATM 116 and a Licensed Money Transmitter computer system 214, as previously described.

Many or most of the software-controlled operations performed by the exemplary software program modules of the present invention are conventional and well-known in the industry. For example, it is conventional and well known to communicate standard ATM and POS messages between a computer system and an ATM network using conventional off-the-shelf ATM and POS software. In an exemplary embodiment, the computer 400 also includes such conventional software to generate and communicate appropriate messages. Conventional software packages also exist which perform a variety of exceeding complex but entirely conventional functions (e.g., maintaining audit trails to ensure transaction reliability, maintaining user account and vender files, provide clearing information, etc.). Such conventional software program modules may also be executed by the computer 400 in an exemplary embodiment. Conventional database management systems may also be executed by the computer 400 for maintaining customer/account information.

The computer 400 may operate in a networked environment using logical connections to one or more remote computers, such as remote computer 460. The remote computer 460 may be a server, a router, a peer device or other common network node, and typically includes many or all of the elements described in connection with the computer 400. In a networked environment, program modules and data may be stored on the remote computer 460. The logical connections depicted in FIG. 4 include a local area network ("LAN") 454 and a wide area network ("WAN") 455. In a LAN environment, a network interface 445, such as Ethernet adapter card, can be used to connect the computer 400 to the remote computer 460. In a WAN environment, the computer 400 may use a telecommunications device, such as a modem 457, to establish a connection. It will be appreciated that the network connections shown are exemplary and other means of establishing a communications link between the computers may be used.

Figure 5:
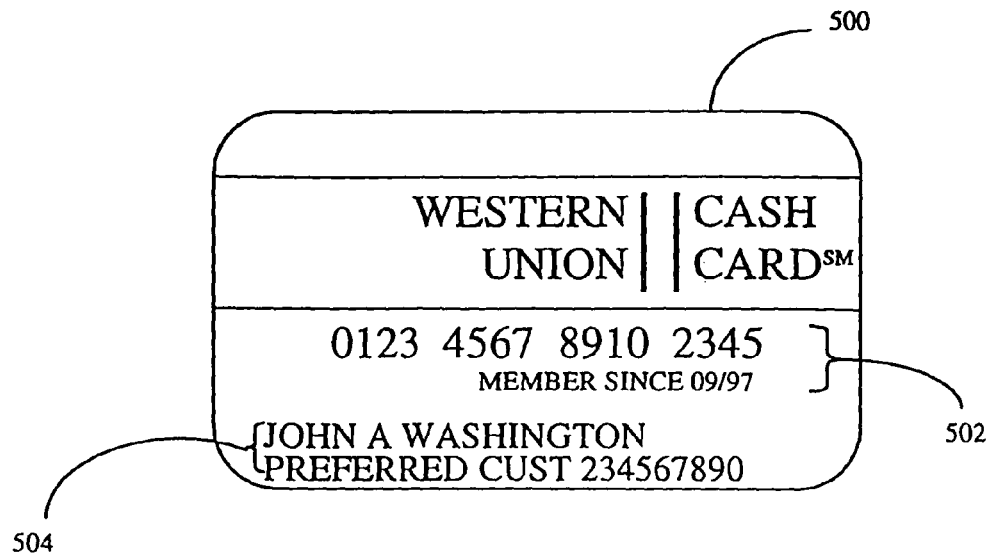
FIG. 5 is an illustration of an exemplary Cash Card$^{SM}$ of the present invention.

Aspects of the present invention may be implemented by way of any account identifying mechanism, such as a plastic card issued to a particular consumer. As shown in FIG. 5, in an exemplary embodiment a consumer is provided with a Cash Card$^{SM}$ 500 that includes identifying information on the front and an encoded magnetic strip on the reverse. Identifying information may include an account identification code 502 and a customer name and number 504. The identifying information may be used to associate a transaction account 102 or a sub-account thereof with the particular consumer.

From the consumer's point of view, funds may be loaded onto and off-loaded from the Cash Card 500 at any time. Thus, the Cash Card 500 eliminates the cash based consumer's need to carry large amounts of cash on his or her person. As previously described, the consumer may authorize the deposit of funds into a transaction account 102 associated with the Cash Card 500 in various ways, such as through direct deposit transactions, POS transactions, ATM transactions, etc. Subsequently, upon presentation of a Cash Card 500 or other account identifier and a personal identification number (PIN), the consumer may access the funds that are stored in his or her name in the transaction account 102.

To request a withdrawal of funds from the transaction account 102, a consumer may present the Cash Card 500 to an agent of the Licensed Money Transmitter operating a POS terminal 112. Alternately, the Cash Card may be presented at an ATM 116. The account identification code 502 may be read by the agent or an automated reader from the front of the Cash Card 500 or from the encoded magnetic strip on the reverse of the Cash Card 500. The account identification code 502, a PIN obtained from the consumer, and other data, such as a requested amount of funds, are transmitted to the transaction control module 211 as a request for issuance of a negotiable instrument. As described previously, the transaction control module 211 interacts with the Licensed Money Transmitter computer system 214 in order to effect an electronic transfer of funds from the transaction account 102 to the POS terminal 112 or the ATM 116 that generated the request for funds. In a similar fashion, the Cash Card 500 may be presented to an agent at a POS terminal 112, an ATM 116, or a teller at a bank 114 in order to conduct a transaction for the deposit of funds into the transaction account 102.

Accordingly, in one embodiment of the present invention, a Cash Card 500 is issued in the name of a particular consumer upon that customer's enrollment as a customer of the Licensed Money Transmitter. Enrollment may entail the provision of certain customer information, such as name, address, phone number, social security number, etc. For liability and/or security purposes, the Licensed Money Transmitter may require some or all of the above-listed customer information prior to providing a consumer with full privileges for depositing and withdrawing funds into and out of the transaction account 102.

Figure 6:
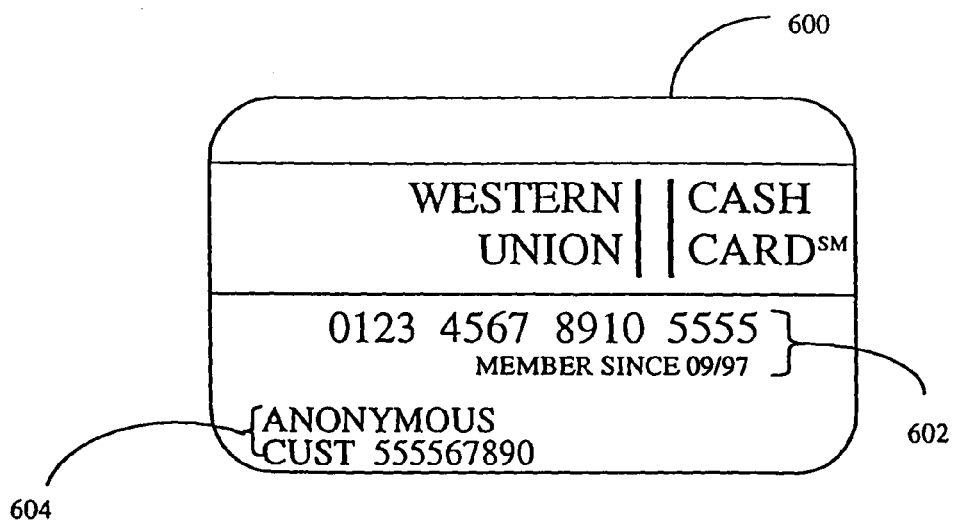
FIG. 6 is an illustration of an exemplary anonymous Cash Card$^{SM}$ of the present invention.

As shown in FIG. 6, an alternate embodiment of the present invention involves the issuance of an anonymous Cash Card 600. An anonymous Cash Card 600 includes an account identification code 602 and an anonymous customer indicator 604. An anonymous Cash Card 600 may be associated with an anonymous transaction account or an anonymous sub-account within the transaction account 102. The anonymous account is identified only by an account code and a PIN that is provided to the consumer of the anonymous Cash Card 600. The anonymous Cash Card 600 may be a one-load Cash Card, meaning that funds may be deposited into the associated anonymous transaction account only one time. Once the initially loaded funds are depleted from the anonymous transaction account, the anonymous Cash Card 600 is no longer valid (unless it is converted to a "regular" Cash Card 500, as will be described below).

An anonymous Cash Card 600 may be sold or otherwise provided to a consumer, who may then request that a particular amount of funds be loaded onto the anonymous Cash Card 600. The consumer of the anonymous Cash Card 600 is provided with a PIN, which may be used to authorize loading of the anonymous Cash Card 600. Funds to be loaded onto the anonymous Cash Card 600 are collected by, for example, an agent of the Licensed Money Transmitter. A credit in the amount of the collected funds is then posted to the anonymous transaction account in the manner previously described. In accordance with one embodiment of the present invention, an anonymous Cash Card 600 may be loaded by the consumer only at a POS terminal 112. Given the anonymous nature of anonymous Cash Card 600 transactions, no direct deposit capabilities are provided.

The funds to be loaded onto the anonymous Cash Card 600 may be limited to specific or incremental dollar amounts. For example, it may be a policy of the Licensed Money Transmitter that no anonymous Cash Card 600 may be loaded with more than a predetermined value. Alternately, an anonymous Cash Card 600 having a first load limit may be sold to consumers for a first price, while an anonymous Cash Card 600 having a second load limit may be sold to consumers for a second price, etc. In another embodiment, an anonymous Cash Card 600 may be pre-loaded with a particular amount of funds. In this manner, the Licensed Money Transmitter may store funds of a predetermined amount in the anonymous transaction account associated with the anonymous Cash Card 600. Then, the pre-loaded anonymous Cash Card 600 may be sold to a consumer for a price equal to the predetermined amount plus any additional service fees.

As mentioned, an anonymous Cash Card 600 may expire upon depletion of the initially loaded funds. An expired anonymous Cash Card 600 may no longer be used by the consumer to deposit funds into or withdraw funds from a transaction account 102. However, the present invention contemplates that an anonymous Cash Card 600 may be converted into a "regular" Cash Card 500 that carries full reload and access privileges, including direct deposit capabilities. Conversion from an anonymous Cash Card 600 to a regular Cash Card 500 requires that the consumer enroll as a customer of the Licensed Money Transmitter. As mentioned above, enrollment entails providing certain customer and account specific information. Enrollment may be performed over the telephone, via the mail, or through any other suitable communications medium. When the consumer has successfully enrolled as a customer, the Licensed Money Transmitter may provide the customer with a new Cash Card 500 and PIN. As is well known in the art, the customer may choose the PIN to be associated with his or her transaction account 102. Alternately, although less desirably, the newly-enrolled customer may continue to use the original anonymous Cash Card 600 and the associated PIN as if it were a regular Cash Card 500.

Figure 7:
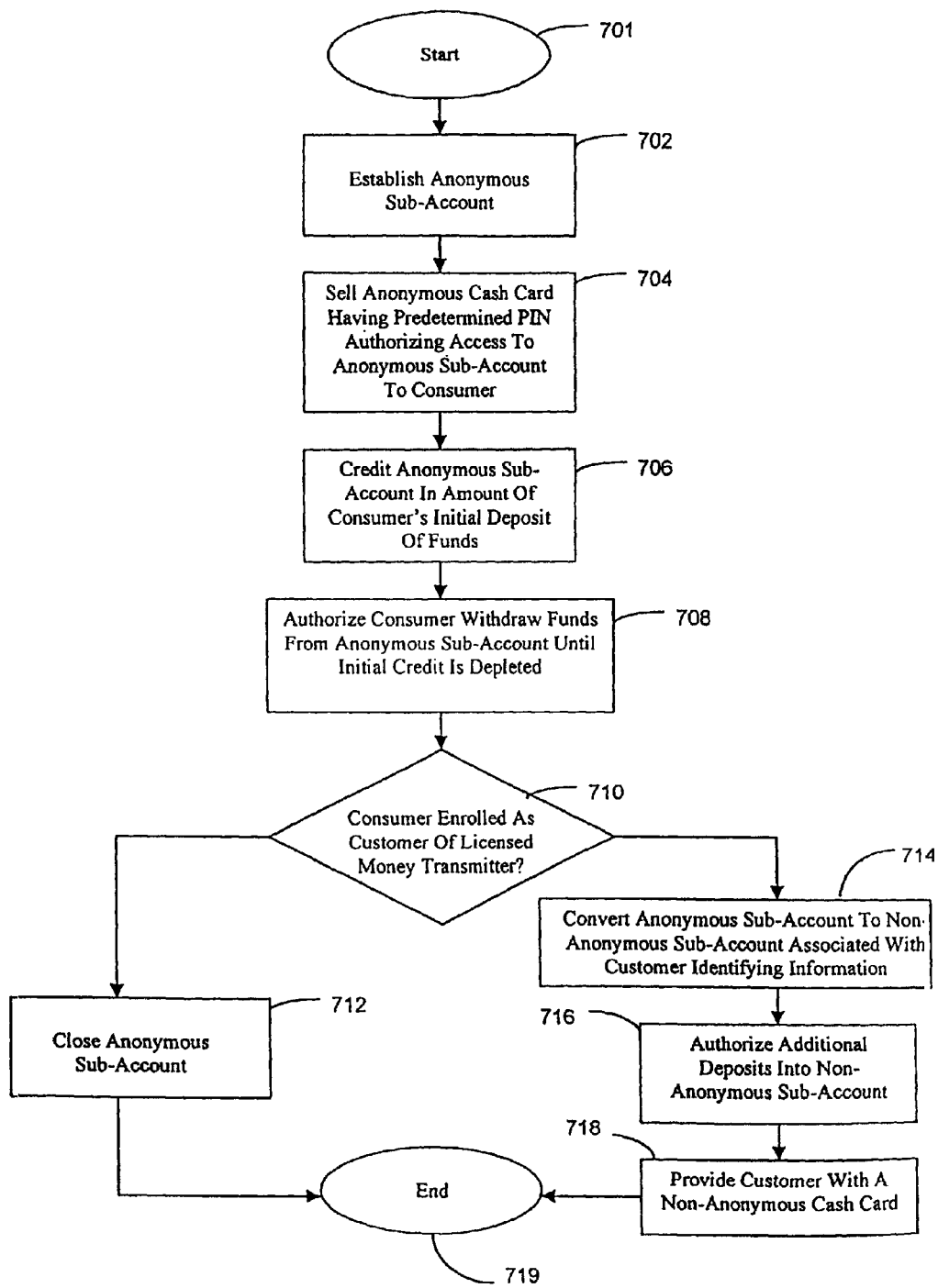
FIG. 7 is a flow diagram illustrating an exemplary method for processing transactions associated with an anonymous Cash Card$^{SM}$.

FIG. 7 is a flow chart illustrating an exemplary method for processing transactions associated with an anonymous Cash Card 600. From starting block 701, the method advances to step 702 where an anonymous sub-account is established within the transaction account 102. The anonymous sub-account is identified only by an account code and is not associated with any consumer identifying information. At step 704, the anonymous Cash Card 600 is sold to a consumer. Along with the anonymous Cash Card, the consumer is also provided a PIN that authorizes access to the anonymous sub-account.

The consumer may then request an initial load of the anonymous Cash Card 600 by presenting the anonymous Cash Card 600, PIN, and funds to an agent of the Licensed Money Transmitter. At step 706, a credit in the amount of the consumer's initial funds deposit is posted to the anonymous sub-account associated with the anonymous Cash Card 600. Once funds are loaded onto the anonymous Cash Card 600, the method proceeds to step 708, where withdrawals may be made until the initial funds have been depleted. At step 710 a determination is made as to whether the consumer has enrolled as a customer of the Licensed Money Transmitter. If the consumer has not enrolled, the method proceeds to step 712 where the anonymous sub-account is closed and the anonymous Cash Card 600 is considered to be expired.

However, if the consumer has enrolled as a customer of the Licensed Money transmitter, the method proceeds to step 714, where the anonymous sub-account is converted into a non-anonymous sub-account associated with customer identifying information. Then at step 716, the non-anonymous sub-account is authorized to receive additional deposits from the customer. At step 718, the customer may be provided with a new non-anonymous Cash Card 500 that is issued in the customer's name and has customer/account information encoded on a magnetic strip or other data storage mechanism. The method ends at step 719.

From a reading of the description above pertaining to the disclosed embodiments of the present invention, modifications and variations thereof may become apparent to those skilled in the art. Other alternatives and variations may also become apparent to those of ordinary skill in the art upon a close examination of this specification in view of the drawings. It should be appreciated that many features and aspects of the present invention were described above by way of example only and are therefore not intended to be interpreted as required or essential elements of the invention. Any elements of the invention that are required or essential would have been explicitly indicated to be so, for example by describing that the element "must" be included. Therefore, the scope of the present invention is to be limited only by the following appended claims.

Figure 8A:
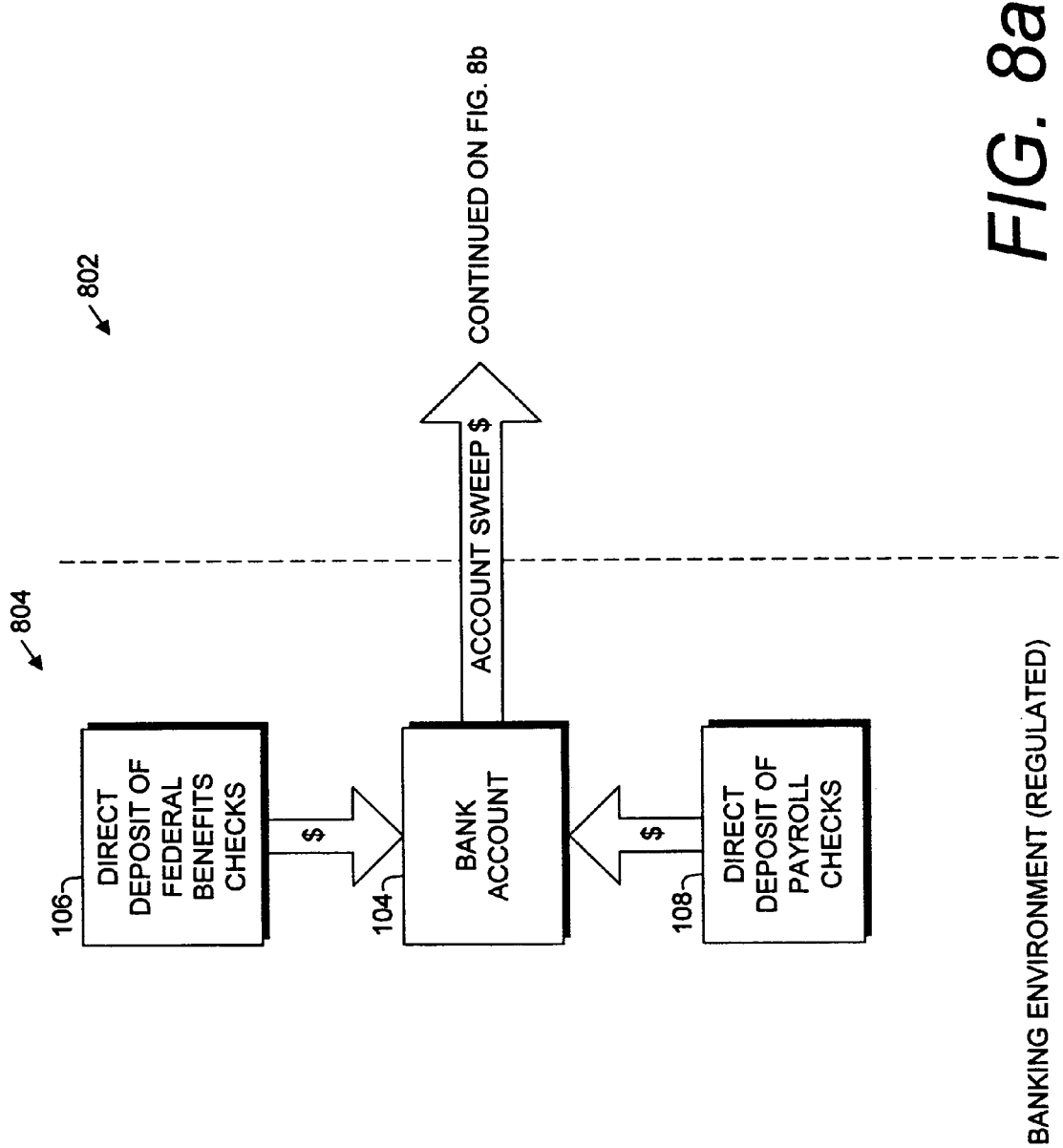
FIG. 8a and FIG. 8b are, taken together, a functional block diagram illustrating a modified embodiment of a system for issuing negotiable instruments.
Figure 8B:
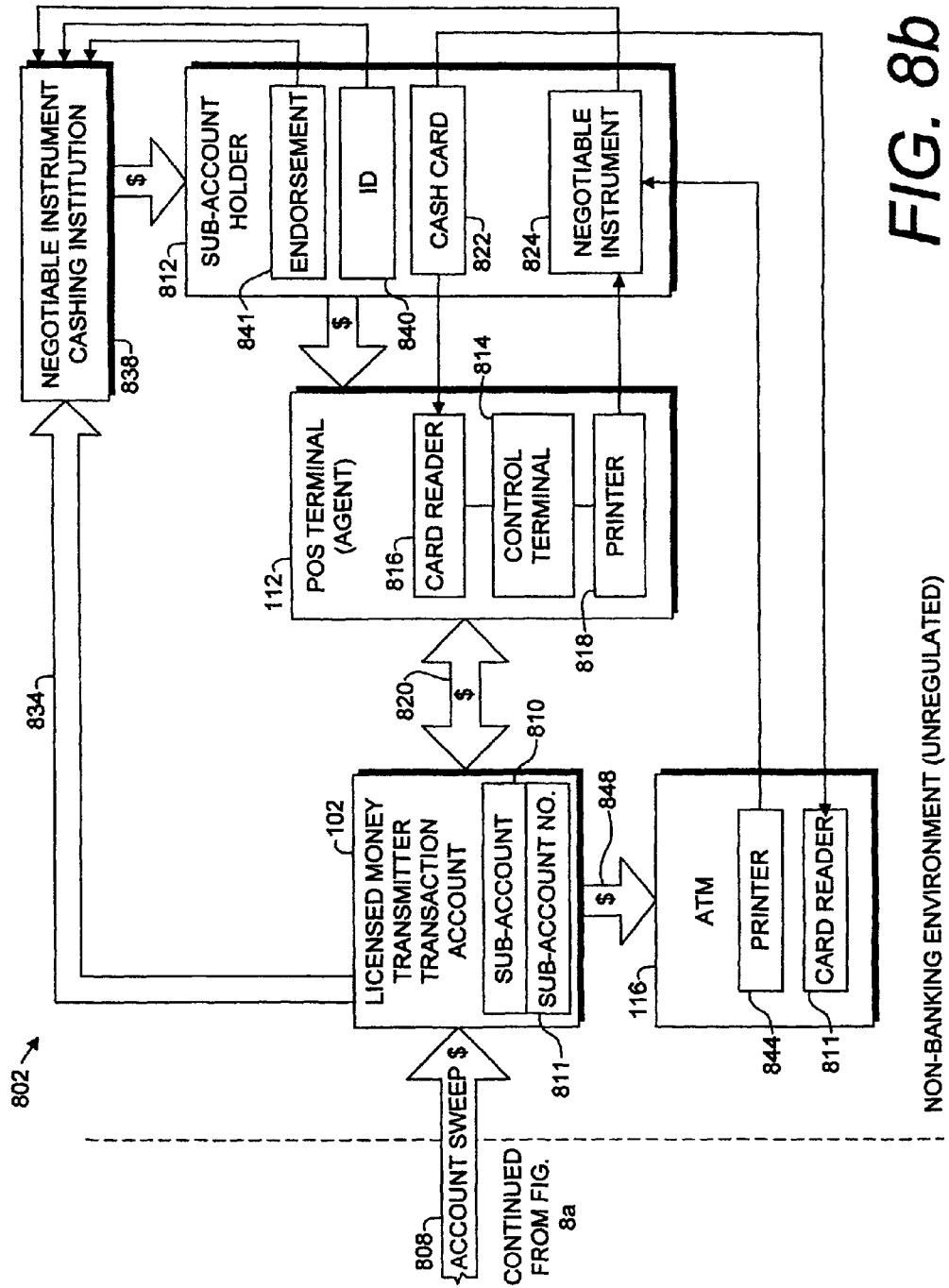
Figure 9:
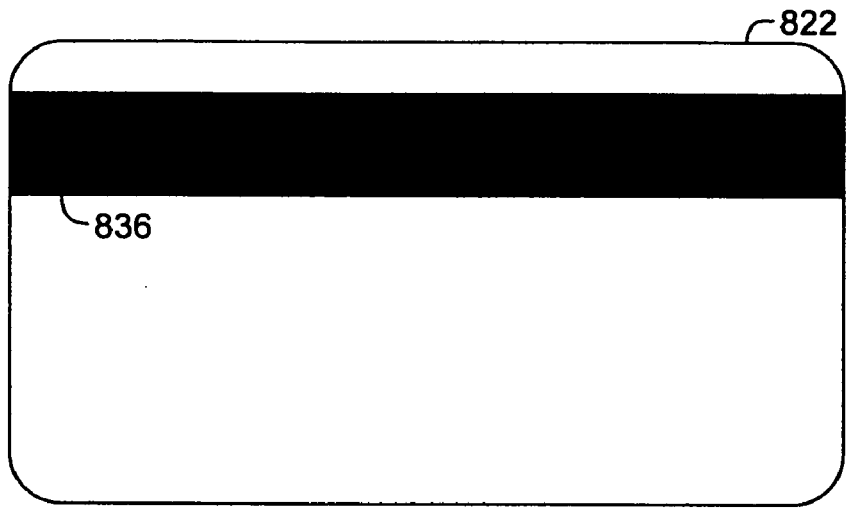
FIG. 9 illustrates a cash card for use in the system of FIGS. 8a and 8b.

Modified Embodiment Cash Card™ System and Method for Issuing Negotiable Instruments A modified embodiment system for issuing negotiable instruments without PIN or signature input is shown in FIGS. 8a and 8b. The system is generally designated by the reference numeral 802. The system 802 optionally includes a regulated banking environment 804 in which certain regulated activities occur and further includes an unregulated, non-banking environment 806 as described above.

The optional banking environment 804 can include a bank account 104 (optionally FDIC insured) for receiving direct deposit of federal benefits checks 106 and direct deposit of payroll checks 108 as described above. An account sweep feature 808, also as described above, can transfer funds automatically and essentially instantaneously from the bank account 104 to the transaction account 102 maintained with a transaction account institution, such as a Licensed Money Transmitter (LMT). The transaction account 102 includes multiple sub-accounts 810 each adapted for association with an entity, such as a customer or consumer (individual, corporate, institutional, etc.), comprising a sub-account holder 812. Although the transaction account 102 has been described in connection with an LMT, other financial institutions would be suitable for maintaining same. Still further, the sub-account holders 812 can transact directly with the transaction account institution 102, thus bypassing the agent 112.

In an exemplary configuration of the system 802, the transaction account institution 102 creates sub-accounts 810 in anticipation of their sales by the POS terminal agents 112. The sub-accounts 810 can be assigned sub-account numbers 811 and, optionally, PINs in advance of their purchase by sub-account holders 812. The term sub-account is used herein to denote accounts which collectively comprise parts of a main account maintained by the transaction account institution 102. However, the terms "account" and "sub-account" are to be construed broadly and interchangeably to encompass all types of financial accounts.

The sub-account holder 812 interacts with the transaction account institution 102 primarily through an agent with a point-of-sale (POS) terminal 112. The POS terminal 112 includes a control terminal 814 linked to a card reader 816 and a printer 818. As indicted by the arrow 820, funds are transferred back and forth between the transaction account institution 102 and the POS terminal (agent) 112. Such transfer reflect deposits to and withdrawals (i.e., the issuance of negotiable instruments 824) from the sub-account 810 by its holder 812.

The POS terminal agents 112 are authorized by the transaction account institution 102 to open and activate sub-accounts 810 and to sell cash cards 822 to sub-account holders 812. Each sub-account holder 812 is issued a Cash Card™ 822 similar to those described above. Preferably the sub-account holder's name is recorded with the sub-account number 811 in the data records maintained by the transaction account institution 102. The Cash Card™ 822 can include a magnetic strip 836 for recording the account number and an optional identifier, such as a PIN, for the sub-account holder 812.

The sub-account holder 812 can obtain negotiable instruments 824 from the POS terminal 112 by swiping the Cash Card™ 822 in the card reader 816 whereupon the control terminal 814 outputs a negotiable instrument 824 via the printer 818 and posts the appropriate debit entries to the sub-account 818 with the transaction account institution 102. The negotiable instrument 824 can comprise any suitable negotiable instrument, such as a check, draft, warrant, money order, traveler's check, etc. Preferably the negotiable instrument 824 is made payable to the sub-account holder 812.

The negotiable instrument 824, made payable to the sub-account holder 812, can be cashed at a negotiable instrument cashing institution 838. Security is provided by making the negotiable instrument 824 payable only to the sub-account holder 812, who can be required to present identification 840 to the cashing institution 838. Moreover, the sub-account holder 812 can be required to endorse the negotiable instrument 824. Still further, the negotiable instrument 824 can optionally include a restrictive legend 842 printed thereon requiring identification 840, endorsement 841 and setting an upper limit 829 for its face value. The cashing institution 838 presents the negotiable instrument 824 to the transaction account institution (LMT) 102, which has already debited the sub-account 810 and makes the necessary funds transfer to the cashing institution 838 as indicated by the arrow at 834.

The ATM 116 (FIG. 8b) represents an optional source of negotiable instruments 824. The Cash Card™ 822 is read by a card reader 846 whereupon the ATM printer 844 prints a negotiable instrument 824. Funds are transferred from the transaction account institution (LMT) 102 to the ATM 116 by the arrow indicated at 848.

Figure 11A:
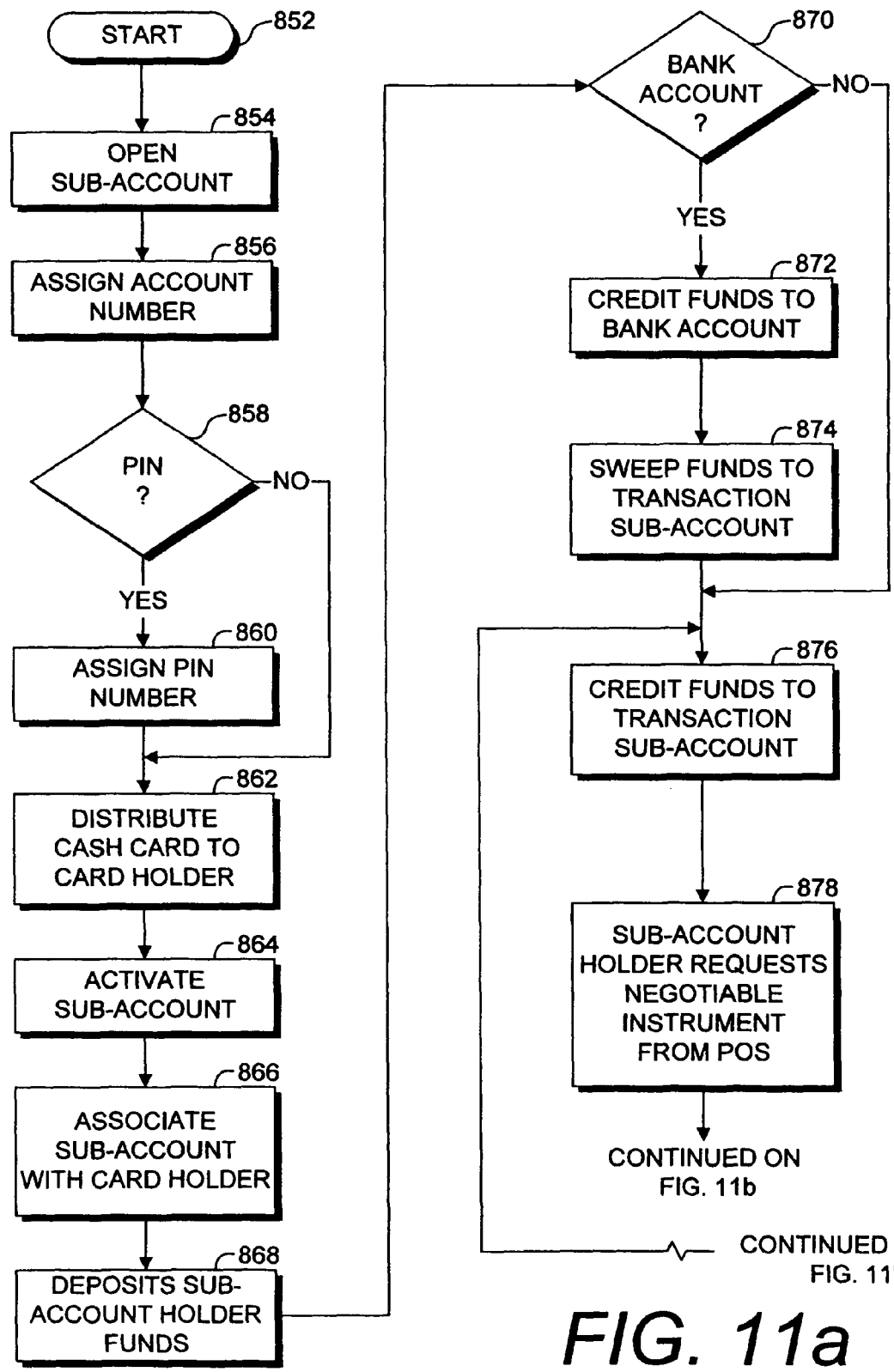
FIG. 11a and FIG. 11b are, taken together, a flow diagram illustrating an exemplary method for issuing negotiable instruments.
Figure 11B:
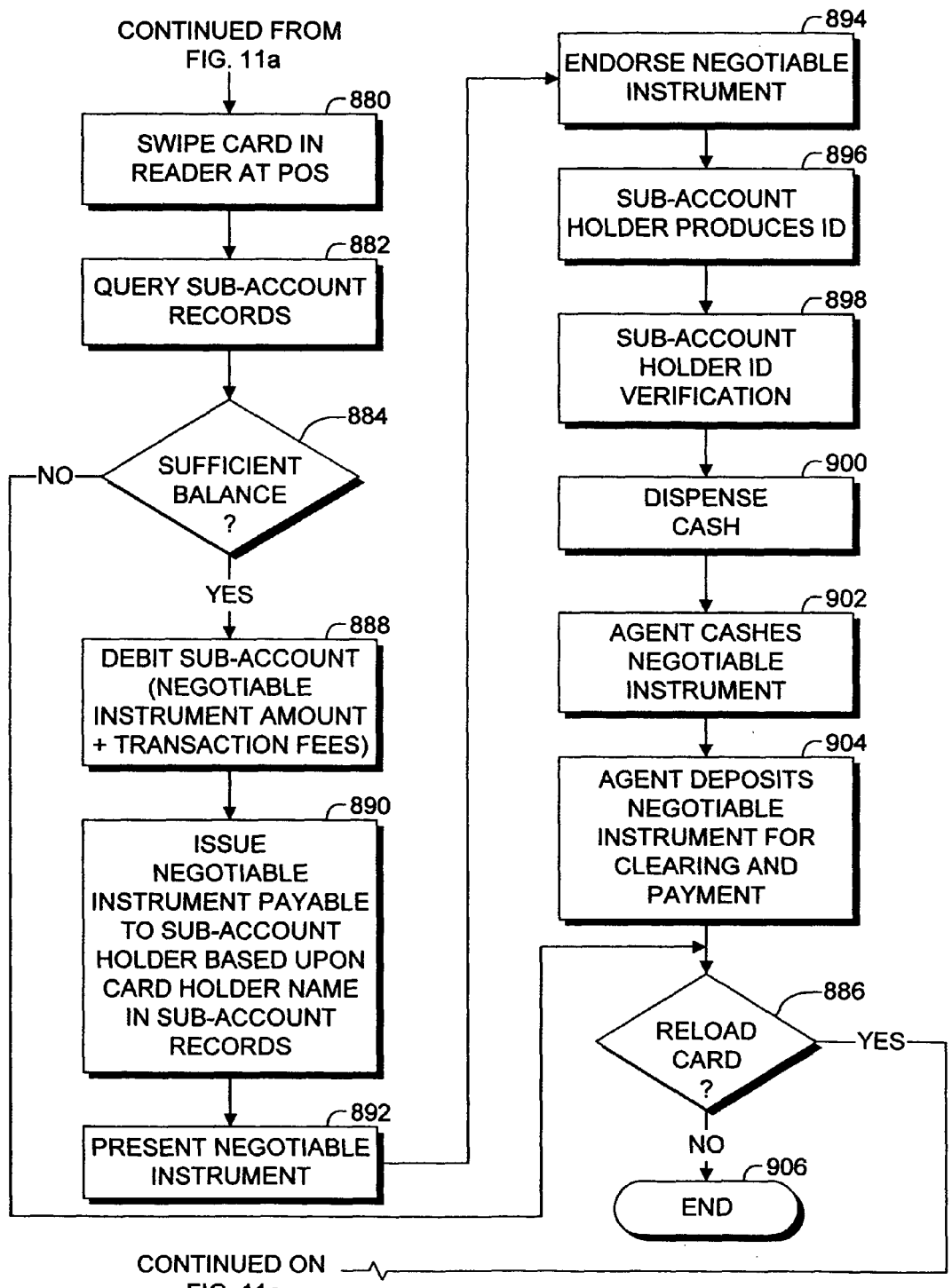

FIGS. 11a and 11b show an exemplary method for issuing negotiable instruments 824. The method starts at 852 and proceeds to an open sub-account step at 854. An account number is assigned at 856. A PIN decision at 858 results in a PIN being assigned at 860 if affirmative. Otherwise, the method proceeds to step 862 whereat the Cash Card™ is sold. Thereafter the sub-account is activated at 864 and the sub-account is associated with the card buyer/sub-account holder at 866, preferably by name. Funds are deposited at 868. If deposited to a bank account (affirmative branch from 870), they are credited thereto at 872 and the funds are swept to a transaction account at 847 as described above. Thereafter, or initially if the funds are deposited directly to the transaction account (negative branch from 870), the transaction sub-account is credited at 876.

The sub-account holder 812 requests a negotiable instrument at 878 by swiping the Cash Card™ 822 in the card reader 816 at the POS terminal 112 at step 880, which queries the sub-account records at 822 for a sufficient balance determination at 884. If negative, the method proceeds to the reload card decision at 886. If affirmative, the sub-account is debited in the amount of the negotiable instrument plus transaction fees at 888, the negotiable instrument is issued at 890 for presentation by the sub-account holder to a negotiable instrument cashing institution at 892. The negotiable instrument is endorsed at 894 and the sub-account holder produces identification at 896 whereby the sub-account holder's identification is verified at 898. Cash is deposited at 900 and the agent cashes the negotiable instrument at 902 and deposits same for clearing and payment at 904. The method then proceeds to a reload card decision at 886. If negative, the method ends at 904. If affirmative, the method returns to step 876 whereat funds are credited to the sub-account 810 at the transaction account institution 102. If negative, the method proceeds to end block 906.

From a reading of the description above pertaining to the disclosed embodiments of the present invention, modifications and variations thereto may become apparent to those skilled in the art. Other alternative and variations may also become apparent to those of ordinary skill in the art upon a close examination of this specification in view of the drawings. It should be appreciated that many features and aspects of the present invention were described above by way of example only and are therefore not intended to be interpreted as required or essential elements of the invention. Any elements of the invention that are required or essential would have been explicitly indicated to be so, for example by describing that the element "must" be included. Therefore, the scope of the present invention is to be limited only by the following appended claims.

I claim:

1. A system for issuing prepaid negotiable instruments to an account holder, comprising:
    a database for storing, in relation to a prepaid account of the account holder, an account identifier and a balance associated with the prepaid account, wherein the balance represents funds deposited to the prepaid account as advance payment for negotiable instruments, wherein withdrawals against the prepaid account are made only by issuance of negotiable instruments, and wherein the prepaid account is maintained by a non-banking institution and the prepaid account is thus not an FDIC insured account;
    a transaction terminal for issuing negotiable instruments, the terminal including a card reader for reading a card having data thereon representing the account identifier, an input device for entering the amount of the negotiable instrument, and a printer for printing the amount on the negotiable instrument;
    a server system in communication with the database and the transaction terminal, the server system receiving the account identifier in response to the card being read at the transaction terminal, accessing the database to determine the balance within the prepaid account associated with the account identifier, authorizing a negotiable instrument to be issued at the terminal if there is a sufficient balance within the account to cover the amount of the instrument, and debiting the prepaid account by the amount of the issued negotiable instrument; and
    a communication link connecting the server system for receiving data from a banking institution, the data relating to a bank account maintained by the banking institution for the benefit of the account holder, for receiving deposits for the account holder and immediately and automatically crediting those deposits to the prepaid account for the benefit of the account holder;
    wherein the account holder is a cash-based consumer not having a relationship with a banking institution, wherein funds are deposited for the benefit of the account holder into the bank account, wherein those funds are then immediately swept into the prepaid account, and wherein the funds are accessed by the account holder only through the issuance of prepared negotiable instruments.

2. The system of claim 1, wherein the deposits received at the bank account are direct deposits through an automated clearinghouse (ACH) system.

3. The system of claim 1, wherein a personal identification number (PIN) is associated with the card, wherein the card is presented by the account holder at the transaction terminal, and the PIN is entered at the input device of the terminal in order for the account holder to request issuance of a negotiable instrument.

4. The system of claim 3, wherein the account is an anonymous prepaid account, wherein the database stores no identifying personal information concerning the account holder, and wherein the server system authorizes issuance of a negotiable instrument without requiring identifying information concerning the account holder other than the account identifier and the PIN.

5. The system of claim 3, wherein the account is an anonymous prepaid account, wherein the database stores no identifying personal information concerning the account holder other than the account holder name to appear as payee on the negotiable instrument, and wherein the server system authorizes issuance of a negotiable instrument without requiring identifying information concerning the account holder other than the account identifier and the PIN.

6. The system of claim 5, wherein the negotiable instrument is issued in the name of the account holder, and wherein the negotiable instrument is preprinted with a restrictive legend requiring identification for cashing the negotiable instrument.

7. The system of claim 6, wherein the negotiable instrument is further preprinted with a restrictive legend setting an upper limit for its face value.

8. The system of claim 1, wherein the transaction terminal is an automated teller machine (ATM).

9. The system of claim 1, wherein the transaction terminal is a point of sale (POS) terminal.

10. The system of claim 1, wherein the non-banking institution is a Licensed Money Transmitter (LMT), wherein the LMT requires a transaction fee for issuing the negotiable instrument, and wherein the transaction fee is deducted from the account when the negotiable instrument is issued.

11. The system of claim 10, wherein the server system authorizes a negotiable instrument to be issued at the terminal if there is a sufficient balance within the account to cover the amount of the transaction fee in addition to the amount of the negotiable instrument.

12. The system of claim 1, wherein the printer prints the name of the account holder on the negotiable instrument so that the negotiable instrument is payable to the account holder.

13. The system of claim 12, wherein the balance associated with the account and stored in the database is limited to a predetermined maximum value.

14. A method for issuing prepaid negotiable instruments to an account holder, comprising:
    storing in a database and in relation to an account of the account holder, an account identifier and a balance associated with the account, wherein the balance represents funds deposited to the account as advance payment for negotiable instruments, wherein withdrawals against the account are made only by issuance of negotiable instruments, and wherein the account is a prepaid account maintained by a non-banking institution;
    issuing a prepaid negotiable instrument at a transaction terminal, the terminal including a card reader for reading a card having data thereon associated with the account identifier, an input device for entering the amount of the negotiable instrument, and a printer for printing the amount on the negotiable instrument;

providing a server system in communication with the database and the transaction terminal, the server system receiving an account identifier in response to a card being read at the transaction terminal, accessing the database to determine the balance within the account associated with the account identifier, authorizing a negotiable instrument to be issued at the terminal if there is a sufficient balance within the account to cover the amount of the instrument, and debiting the account by the amount of the negotiable instrument so that the negotiable instrument issued at the transaction terminal is prepaid;

maintaining a bank account at a banking institution for the benefit of the account holder and for receiving direct deposits for the account holder; and upon any such deposit, immediately and automatically debiting the bank account by the amount of the deposit and crediting such deposit to the balance stored in the database for the prepaid account for the benefit of the account holder;

wherein the account holder is a cash-based consumer not having a relationship with a banking institution, wherein funds are deposited for the benefit of the account holder into the bank account, wherein those funds are then immediately and automatically swept into the prepaid account, and wherein the funds are accessed by the account holder only through the issuance of prepaid negotiable instruments.

15. The method of claim 14, further comprising printing the name of the account holder on the negotiable instrument as the payee and printing a restrictive legend requiring identification in order to cash the negotiable instrument.

* * * * *